(No Model.)  3 Sheets—Sheet 1.
N. MILBANK.
MILK WAGON.
No. 518,848.  Patented Apr. 24, 1894.
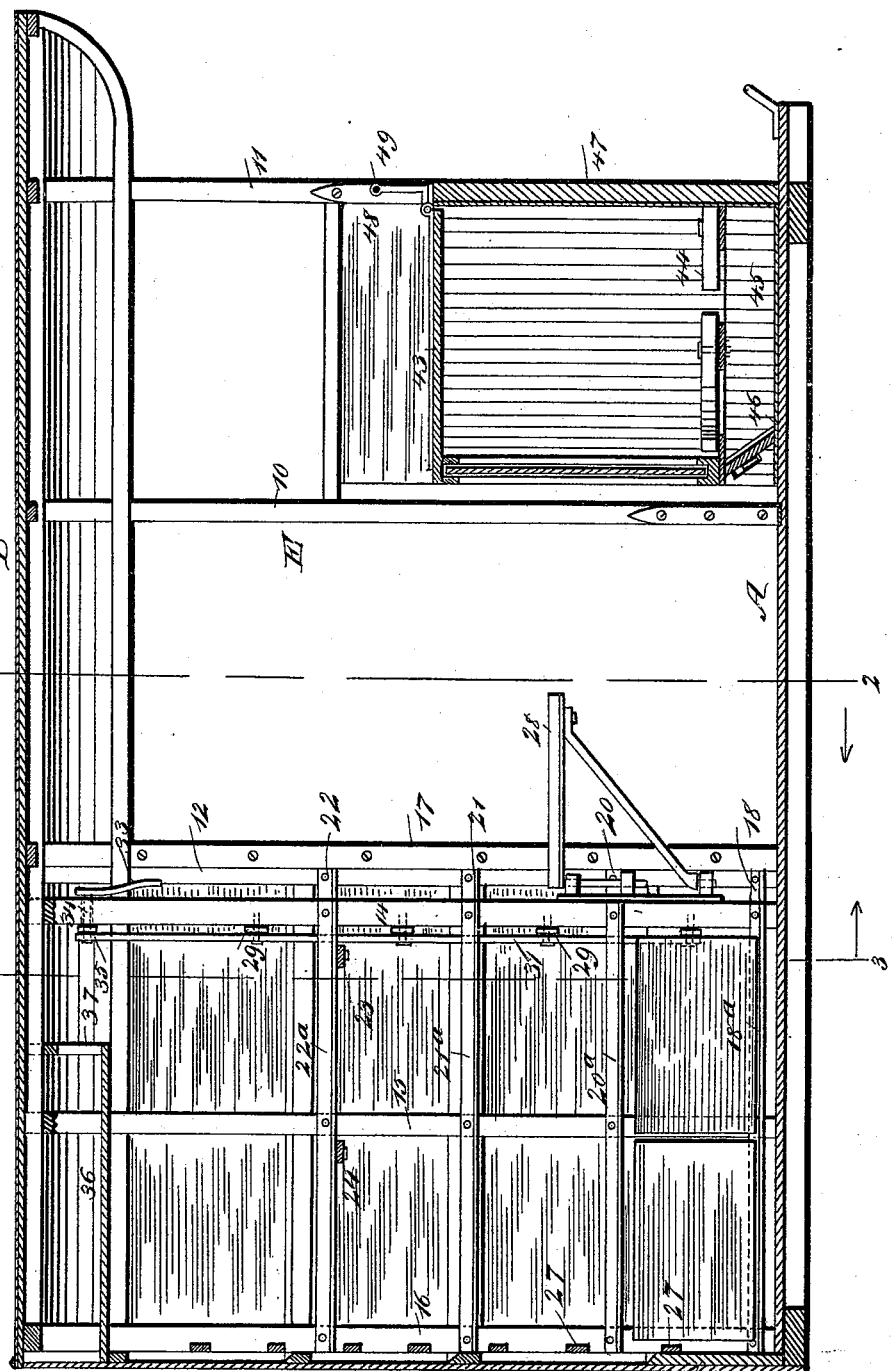
WITNESSES:  INVENTOR
  N. Milbank
BY
  Munn & Co
  ATTORNEYS.

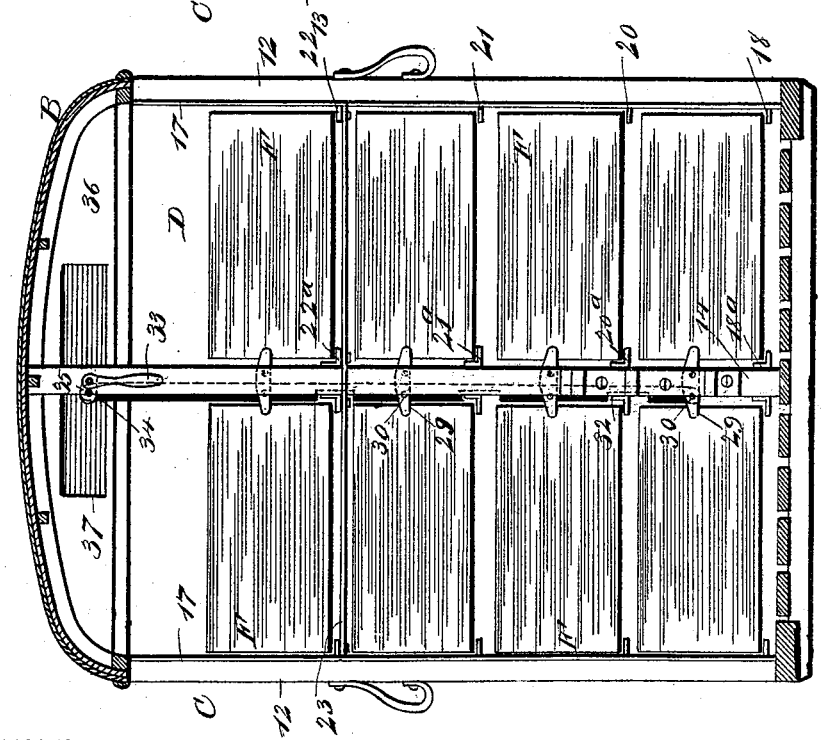

(No Model.) 3 Sheets—Sheet 3.
N. MILBANK.
MILK WAGON.
No. 518,848. Patented Apr. 24, 1894.
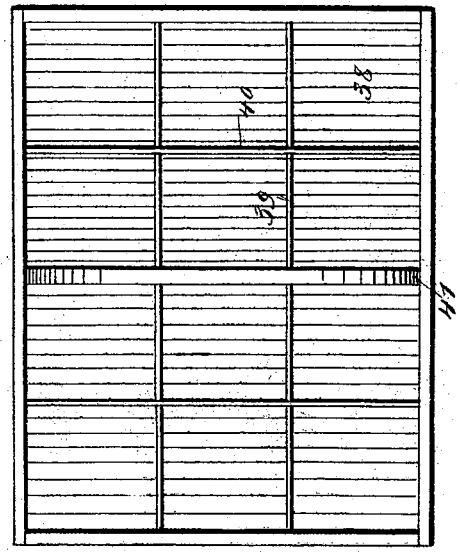
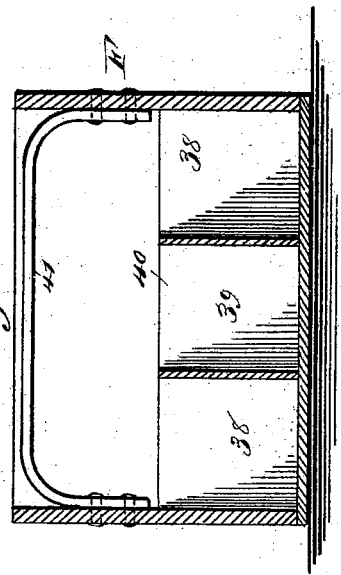
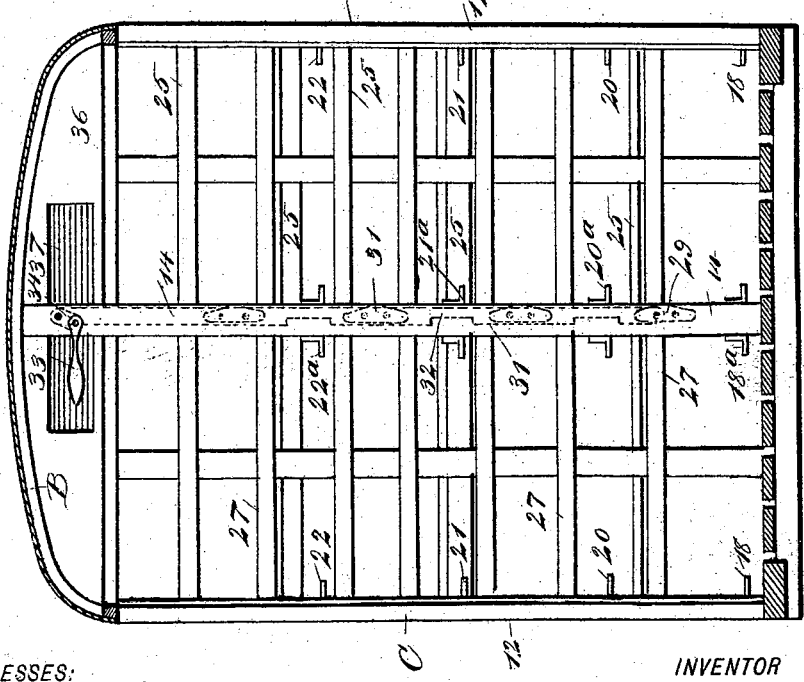
WITNESSES:
INVENTOR
N. Milbank
BY
Munn & Co
ATTORNEYS.

UNITED STATES PATENT OFFICE.

NICHOLS MILBANK, OF NEW YORK, N. Y., ASSIGNOR TO THE NEW YORK CONDENSED MILK COMPANY, OF SAME PLACE.

MILK-WAGON.

SPECIFICATION forming part of Letters Patent No. 518,848, dated April 24, 1894.

Application filed December 8, 1893. Serial No. 493,081. (No model.)

*To all whom it may concern:*

Be it known that I, NICHOLS MILBANK, of New York city, in the county and State of New York, have invented a new and Improved Milk-Wagon, of which the following is a full, clear, and exact description.

My invention relates to an improvement in milk wagons, and it has for its object to provide a milk wagon constructed in such manner that bottled milk in suitable cases may be carried in the wagon in a most convenient manner for removal, and wherein when the boxes of milk are contained in the wagon they will be firmly held in place, and wherein further, the boxes which the wagon is adapted to receive may be those in which the milk was primarily packed, thus avoiding twice handling of the milk which has been heretofore necessary, since the bottles under the previous construction of such milk wagons were removed from the cases in which they were originally packed, and placed in cases or carriers especially adapted for cartage in the wagon.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a longitudinal vertical central section through a wagon. Fig. 2 is a transverse section taken practically on the line 2—2 of Fig. 1, and looking in direction of the rear of the wagon, boxes being shown as locked in position in the racks of the wagon. Fig. 3 is a transverse vertical section taken practically on the line 3—3 of Fig. 1, and looking in the direction of the front of the wagon. Fig. 4 is a view similar to Fig. 2, the triggers or latches being shown in released or open position, and the boxes removed. Fig. 5 is a plan view of one of the boxes or cases, adapted to receive the bottles of milk and to be placed in the wagon. Fig. 6 is a transverse vertical section through the boxes or cases illustrated in Fig. 5; and Fig. 7 is a detail view of the latches or triggers and the connecting rod controlling them.

In carrying out the invention the wagon body consists of a bottom A, a top B, sides C and a back D, the latter being closed, and the sides are provided with transversely opposite doors E, through the medium of which access is obtained to the interior of the body. The sides of the body are usually provided with two uprights 10 and 11, located forward of the door openings E, the inner upright 10, forming one of the door posts and the upright 11 the outermost post. At the rear of the door openings E three uprights are located at proper distances apart, two of them 12 and 13, being illustrated, the uprights 12 being shown in Figs. 1 and 2 and the uprights 13 in Fig. 3. The side uprights 12 form the rear posts for the doorways E. The uprights 13, are located between the rear end of the body and the uprights 12, while the remaining upright of the three described is the rearmost upright in the body. In addition to the three rear uprights at each side of the wagon body three central uprights are likewise provided, designated respectively as 14, 15 and 16. The forward central upright or post 14, is preferably located a slight distance back of the side uprights 12, and the rearmost side uprights above alluded to are one at each side of the rearmost central upright 16, while the central upright 15 is located preferably about centrally between the uprights 14 and 16.

A metal wear plate 17, is preferably secured upon the inner face of the uprights 12 constituting the rear posts of the door openings E, the said metal plate serving to protect the uprights 12 against wear by coming in contact with the boxes or cases while being loaded into the wagon.

At or near the bottom of the wagon at each side thereof, transversely aligning angle irons 18, are securely fastened to the rearmost side uprights, the intermediate uprights 13 and the uprights 12, the said angle irons serving as slide-ways; and between the lower slide-ways 18 and the top of the wagon body, corresponding angle irons 20, 21 and 22, are secured in like manner to the inner side faces of the wagon body, constituting further slide-ways; any desired number of said slide-ways may be employed. Similar slide-ways 18ª, 20ª, 21ª and 22ª are located in pairs upon opposite faces of the central uprights 14, 15 and 16, the slide-ways at the center of the body of the wagon being in transverse alignment with those of the side, and all of the slide-ways are preferably of angle iron, and in order that the sides of the body shall not spread out or become weakened, transverse braces 23 and 24 are employed, preferably attached to the angle irons 22 and 22ª, extending from side to side of the body.

The back end D of the wagon is built up solidly, and the rear uprights are secured to battens 25, attached to the solid back, and a lower board 26, employed in like manner as the battens. The end uprights are thus held removed from the solid back, and serve as supports for a series of transverse slats 27, adapted to receive the impact of the boxes loaded upon the slide-ways. The seat 28 for the driver, is usually pivoted upon the lower front portion of the central post or upright 14.

A series of triggers or latches 29, is fulcrumed upon the rear face of the central post or upright 14. These latches or triggers when in a horizontal position are adapted to extend beyond both sides of the said central post or upright, as illustrated in Fig. 2. The triggers or latches are pivoted to the post between their centers and one of their ends, the pivot pin being designated as 30, and it is shown best in Fig. 7; and all of the latches are pivotally connected with a trip bar 31, the pivotal connection between the trip bar and the latches being practically the same distance from the center of the latches as the pivots 30 but between the center and opposite end, as is likewise best shown in Fig. 7. The latches are so located that one of them will be between each of the slide-ways, and the upper slide-way and top of the wagon; and the connecting bar of the latches is provided with series of recesses 32, whereby when the latches are thrown to their horizontal or locking position, the upper edges of the various recesses 32 will rest upon the slide-ways, thus limiting the downward throw of the bar. The manipulation of the bar is accomplished through the medium of a lever 33, located preferably at the upper forward portion of the single post 14, and the said lever is attached to a spindle 34, mounted to turn in the said upright or post, and the rear end of the post is attached to one end of a link 35, the opposite end of the link being pivotally connected with the upper portion of the trip rod 31. Thus when the rod is forced downward to carry the latches to locking position, the rod is carried in direction of one side of the body as it moves downward, and when the lever is turned to draw the trip bar 31 the said bar will be carried in direction of the opposite side of the body and will draw the latches to a vertical position back of the post or upright 14, as shown in both Figs. 3 and 4.

In the upper portion of the wagon body, preferably under the roof thereof, a storage compartment 36, is formed, having an opening 37 in its front through which various articles may be introduced into said compartment by the driver, or removed therefrom. One of the boxes or cases F, adapted to be placed upon the slide-ways, is shown in detail in Figs. 5 and 6, and the said box F, is divided into a series of compartments 38 by partitions 39 and 40, extending longitudinally and transversely of the box, which partitions are preferably one-half the height of the box. The compartments 38, are adapted to receive the bottles of milk, or bottles filled with any desired fluid, and each box is provided with a central handle 41, preferably secured to its sides, the handle being contained wholly within the box, since the top of the handle is below the plane of the upper edge of the box, as clearly shown in Fig. 6.

The jars or bottles of milk are placed in the boxes F at the packing house, and are shipped one box upon the other to the place from which the delivery wagons start. Hitherto it has been necessary to remove the bottles of milk from the original boxes, or those in which they were shipped, and transfer the bottles to baskets or crates adapted to be carried in the wagon; but under the present construction of the wagon, when the boxes or cases F are delivered filled to the wagons they are placed upon the slide-ways, preferably two at each side of the central posts or uprights, as shown in Figs. 1 and 2, and when all the slide-ways are filled the lever 33 is manipulated to throw the latches or triggers to their horizontal or locking position.

In the forward portion of the wagon, between the uprights 10 and 11, two closet like receptacles or refrigerators G and H are located. These receptacles or refrigerators are located side by side, and one of them, the receptacle or refrigerator G, for example, is provided with a hinged door 42, which faces the driver's seat 28, and in this receptacle shelves may be placed, and preferably are so placed, to receive bottles or packages of any description, while the opposite receptacle or refrigerator H, is adapted to contain a can of milk, and to that end is provided with a lid 43, at the top, and with a grated bottom 44, while beneath the bottom 44 a chamber 45, is located, in which a pan or like article may be placed to catch drippings from the ice placed around the can if any such drip occurs. The lower compartment 45 is closed by a door 46. The lower front portion of the body of the wagon is closed by a panel 47, and the sides are closed by a panel 48, while a bar 49, is located over the front panel 47, being a guide bar for the reins.

A wagon constructed as above set forth is exceedingly simple, it is durable, and it is especially adapted for the purpose to which it is to be applied, namely, that of delivering milk or other fluids in bottles or equivalent packages.

Having thus described my invention, I claim as new and desire to secure by Letters Patent—

1. In a milk delivery wagon, a series of compartments having slideways for supporting milk receptacles, a series of latches pivoted to supports adjacent to such compartments, and a device pivotally connected with said latches and adapted to turn them into or out of the said compartments, for securing or releasing the milk receptacles, as shown and described.

2. In a wagon for the delivery of milk, a series of compartments, slide-ways located in said compartments, a support located between the compartments, latches pivotally connected with the support and capable of extending into transversely opposing compartments, a trip bar connected with the latches, and a lever connected with the trip bar, whereby it is operated, substantially as set forth.

3. In a delivery wagon, the combination, with the body thereof provided with a series of communicating compartments, each compartment being provided with slide-ways, of a post located at one end of all of the compartments, latches eccentrically pivoted upon the said posts, one latch being adapted to extend beyond the post into two adjoining compartments, a trip bar connecting the latches, and a crank connected with the bar whereby it may be drawn on vertically, as and for the purpose set forth.

4. In a delivery wagon, the combination, with the body thereof provided with side posts or uprights, a central set of posts or uprights, tie bars connecting the sides, and slide-ways arranged in transverse alignment along the side uprights and both sides of the central uprights, of boxes or cases adapted to be supported upon the slide-ways, latches pivoted to one of the outer central uprights and adapted to extend beyond opposite sides of the uprights to an engagement with the outer faces of the boxes or cases, a trip bar connecting the latches, and a means, substantially as shown and described, for operating the bar and limiting its downward movement, as and for the purpose set forth.

5. In a delivery wagon, the combination, with the body thereof provided with side posts or uprights, a central set of posts or uprights, tie bars connecting the sides, and slide-ways arranged in transverse alignment along the side uprights and both sides of the central uprights, of boxes or cases adapted to be located on the slide-ways, latches eccentrically connected with one of the outer central uprights, said latches when in locking position being adapted to engage with the outer surface of the cases, a connecting rod eccentrically attached to all of the latches and provided with recesses to receive the slide-ways, a crank arm connected with the connecting rod, and a lever attached to said crank arm, as and for the purpose specified.

NICHOLS MILBANK.

Witnesses:
J. FRED ACKER,
C. SEDGWICK.

It is hereby certified that the assignee, "the New York Condensed Milk Company," in Letters Patent No. 518,848, granted April 24, 1894, upon the application of Nichols Milbank, of New York, N. Y., for an improvement in "Milk-Wagons," should have been described and specified as *the New York Condensed Milk Company, of same place, a corporation of New Jersey*, instead of "the New York Condensed Milk Company, of same place;" and that the said Letters Patent should be read with this correction therein that the same may conform to the record of the case in the Patent Office.

Signed, countersigned, and sealed this 22d day of May, A. D. 1894.

[SEAL.]

JNO. M. REYNOLDS,
*Assistant Secretary of the Interior.*

Countersigned:
    JOHN S. SEYMOUR,
        *Commissioner of Patents.*